United States Patent [19]
van Adelsberg

[11] 4,133,137
[45] Jan. 9, 1979

[54] INSECT TRAP

[75] Inventor: Martin M. van Adelsberg, King of Prussia, Pa.

[73] Assignee: Pennwalt Corporation, Philadelphia, Pa.

[21] Appl. No.: 817,301

[22] Filed: Jul. 20, 1977

[51] Int. Cl.² ............................................. A01M 1/14
[52] U.S. Cl. ....................................... 43/114; 229/22
[58] Field of Search ................. 43/114, 118, 122, 107, 43/115, 136; 229/22; 206/805, 427; 150/11; 428/7-9

[56] References Cited
U.S. PATENT DOCUMENTS

| 490,680 | 1/1893 | Roberts | 229/22 |
| 884,095 | 4/1908 | Kronenberg | 43/114 |
| 1,112,064 | 9/1914 | Gordon | 43/114 |
| 1,511,682 | 10/1924 | Skelly | 43/114 |
| 3,755,958 | 9/1973 | Bradshaw | 43/114 |

*Primary Examiner*—Nicholas P. Godici
*Assistant Examiner*—Roscoe V. Parker
*Attorney, Agent, or Firm*—Charles N. Quinn

[57] ABSTRACT

An insect trap is in the form of a hollow polygonal body with an insect-attracting insecticide applied to an inner surface. One or more holes in a downward facing submedial surface of the trap allow insects to enter the trap interior. The trap self-deploys from a single scored planar sheet due to force applied by resilient means secured to positions on the planar sheet corresponding to separate surfaces of the polygonal body.

10 Claims, 4 Drawing Figures

INSECT TRAP

BACKGROUND OF THE INVENTION

1. Field of the Invention

This invention relates to insect traps.

2. Description of the Prior Art

Collapsible insect traps are known; they allow the trap to be transported, in a collapsed, compact state, to the area where insect populations must be reduced; the traps need not be assembled until they are distributed in the area of high insect concentrations. Such traps are disclosed in U.S. Pat. Nos. 1,029,001, 1,112,064 and 1,333,470, and in German patents Nos. 222,012 and 934,616. These collapsible traps require active manipulation for assembly.

SUMMARY OF THE INVENTION

The present invention provides a self-deploying insect trap in the form of a hollow body, with an insect attracting insecticide and with a funicular member extending outwardly for entangling vegetation, to suspend the trap therefrom. The trap has a hole therethrough for passage of insects into the trap. No active manipulation is required for trap assembly.

DESCRIPTION OF THE PREFERRED EMBODIMENTS

Figure 1:
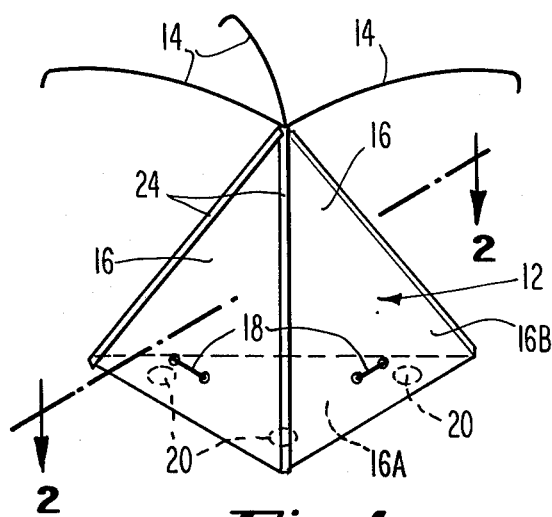
FIG. 1 is an isometric view of the self-deploying insect trap in the fully deployed condition.

Referring generally to FIG. 1, the insect trap is designated generally 10 and has a hollow, polygonal body, designated generally 12, with funicular, preferably curvilinear and diverging, means 14 extending from the hollow body for fixedly entangling branches of vegetation as the hollow body passes proximate the branches. Funicular means 14, by entangling branches of vegetation, suspend the insect trap therefrom. Holes 20 are provided for entrance of insects therethrough; the holes are formed in a surface which is downwardly facing submedial surface when hollow body 12 is oriented such that the position from which funicular means 14 extend is a zenith, as shown in FIG. 1.

Figure 2:
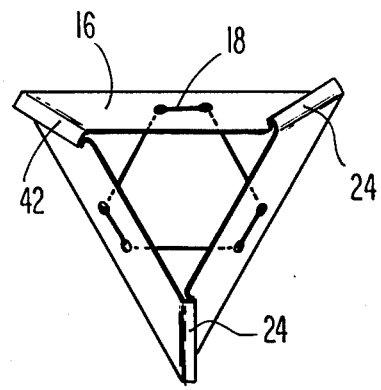
FIG. 2 is a sectional view taken along arrows 2—2 as shown in FIG. 1.

The insect trap self-deploys due to the action of resilient means 18, which is preferably a rubber band or a spring, connecting at least some of the sides of body 12. As shown, resilient means 18 can be a single continuous rubber band interleaved through holes in sides of polygonal body 12. Side flange means 24 are provided for closing edges of adjoining preferably planar surfaces 16 which form hollow body 12. Side flanges 24, by covering junctures of adjacent surfaces 16, block entry of rain into the hollow body. This is best shown in the sectional view of FIG. 2.

Figure 3:
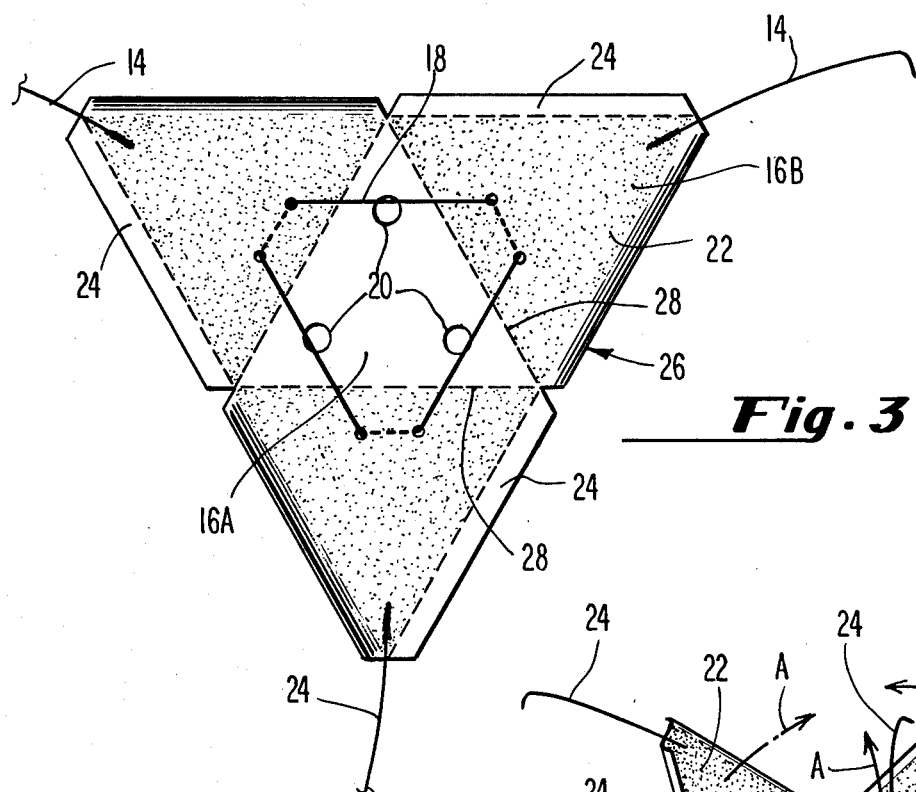
FIG. 3 is a view of the insect trap prior to deployment, showing the prescored blank from which the trap deploys.

Referring to FIG. 3, the insect trap self-deploys from a prescored blank, designated generally 26, by bending along score lines 28 due to urging of resilient means 18. The blanks are preferably stored in a flat box so that they may be pulled therefrom individually and hurled into trees, vines and the like where insects reside. As a blank flies through the air it self-deploys and, as it passes close to the vegetation, it suspends itself therefrom by funicular means 14 entangling branches of the vegetation.

As shown in FIG. 3, it is preferable that resilient means 18 be connected to at least all of the side surfaces 16B of the polygonal body. Resilient means 18 may also be connected to base 16A of the polygonal body. Resilient means 18 may be secured either to exterior or interior portions of surfaces 16, as desired.

Figure 4:
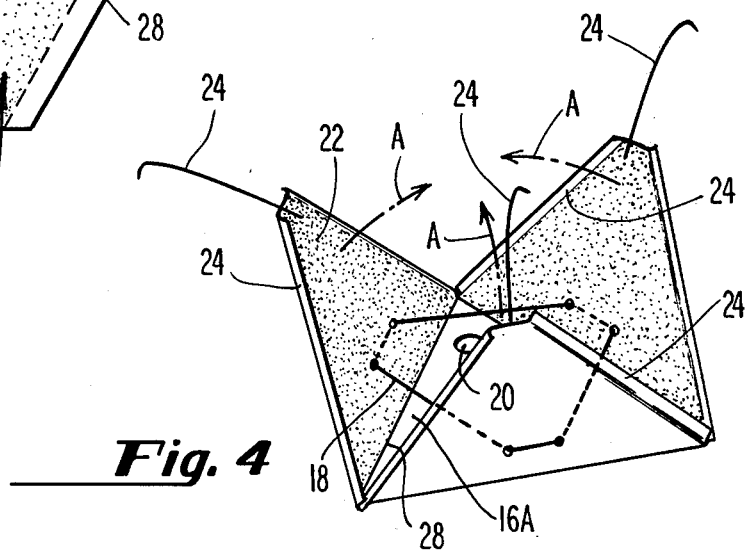
FIG. 4 is a view of the insect trap self-deploying.

The action of the trap in self-deploying is best shown in FIG. 4 where arrows A denote movement of side surfaces 16 of the hollow body as side surfaces 16 bend along score lines 28 to form body 12.

The insect trap and particularly hollow body 12 may be of any form; it is not limited to the triangular pyramid shown in the drawings. Specifically, bottom pannel 16A may be in any form, and preferably is in the form of a regular polygon. Similarly side panels 16B in FIG. 1 may be of any shape, so long as when they are closed by resilient means 18 and bend along score lines 28, a hollow body is formed. Of course hollow body 12 in the preferred form shown in FIG. 1 is a regular polygonal body, having all four sides of equal area.

When a body of N+1 sides is desired, the trap can be formed with a base or bottom panel shaped as a preferably regular polygon of N sides, with the N sides defined by score lines in the prescored blank. The remaining N sides of the body can be defined by N preferably identical side panels, where each side panel is integrally connected to the base or bottom panel at the score line and is foldable with respect to the base or bottom panel along the score line to contact two adjacent contiguous side panels along edges of each side extending away from the bottom panel.

Prescored blank 26 is preferably fabricated of weather resistant paper board which may be of the type coated with plastic. The insect attracting insecticide which is preferably applied to at least one interior surface of hollow body 12, as denoted by numeral 22, is preferably a combination of a pesticide and an attractant. Suitable pesticides include those sold under the trademarks Vapona, Dibrom and Gardona. Suitable attractants include those sold under the trademarks Disparlure, Trimedlure, and Codliemone. The insecticide need not be applied to the interior surface of the trap but rather can be dispensed from a small vial secured within the trap. Similarly, surface 22 can be a sticky, insect attractive surface to which insects adhere; this eliminates the need for a pesticide and consequently has environmental advantages.

I claim the following:

1. A self-deploying insect trap comprising:
   (a) a closed hollow polygonal body, all surfaces thereof being flat and formed from a single scored rigid planar sheet, having an insect attracting insecticide therewithin when said body is assembled, at least one surface having at least one aperture for passage therethrough of insects into said hollow body when said trap is deployed;
   ((b) a plurality of curvilinear funicular means extending divergently outwardly from said body, for entangling branches of vegetation upon airborne passage of said body proximate thereto thereby suspending said body therefrom; and
   (c) tensioned elastic resilient means, secured to at least some surfaces of said body, for urging said surfaces to converge towards one another into positions forming said closed hollow body from said sheet, as said elastic resilient means contracts to at least partially relieve tension therein, by rotation of said surfaces with respect to each other along score lines of said sheet.

2. The insect trap of claim 1 wherein said hollow polygonal body is a regular polygon.

3. The insect trap of claim 2 wherein at least one surface of said body is a downwardly facing submedial surface, when the position from which said entangling means extend is supermedial, and has a hole for entrance of insects therethrough into said body.

4. The insect trap of claim 1 wherein said resilient means is secured to inner surfaces of said body.

5. The insect trap of claim 1 wherein said resilient means is secured to outer surfaces of said body.

6. The insect trap of claim 1 further comprising side flanges, connected to surfaces of said hollow body, for covering junctures of adjacent surfaces thereby blocking entry of rain into said body.

7. The insect trap of claim 1 wherein all of said funicular means extended outwardly away from a single vertex of said body.

8. A self-deploying insect trap comprising:
(a) a unitary prescored blank for folding to form an N+1 sided polygonal body portion of said trap, said blank comprising:
  (i) an N-sided polygonal bottom panel, said N-sides defined by score lines in said blank;
  (ii) N side panels, each integrally connected to said bottom panel at one of said N sides thereof, each side foldable at said bottom panel connection along a score line to contact two adjacent contiguous side panels along edges thereof extending away from said bottom panel;
wherein an insect attracting insecticide is connected to at least one interior surface of said polygonal body;
(b) funicular means extending outwardly from said body, for entangling branches of vegetation upon airborne passage of said body proximate thereto thereby suspending said body therefrom; and
(c) resilient means secured to said side panels, for urging said side panels to converge, by bending at said score lines, to form said body.

9. The insect trap of claim 8 wherein said polygonal body is a regular polygon.

10. The insect trap of claim 8 wherein all of said side panels are identical.

* * * * *